United States Patent
Sheldon et al.

(10) Patent No.: US 10,864,872 B2
(45) Date of Patent: Dec. 15, 2020

(54) OCCUPANT AIRBAG AND CONTROL SYSTEM FOR USE IN AUTONOMOUS VEHICLES WITH RETRACTABLE STEERING WHEELS

(71) Applicant: GM Global Technology Operations LLC, Detroit, MI (US)

(72) Inventors: Mark M. Sheldon, Shelby Township, MI (US); Carolyn M. Mavis, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 293 days.

(21) Appl. No.: 16/008,561

(22) Filed: Jun. 14, 2018

(65) Prior Publication Data

US 2019/0381962 A1 Dec. 19, 2019

(51) Int. Cl.
| | |
|---|---|
| *B60R 21/01* | (2006.01) |
| *B60R 21/203* | (2006.01) |
| *B62D 1/183* | (2006.01) |
| *B60R 21/233* | (2006.01) |
| *B60R 21/205* | (2011.01) |
| *B60R 21/207* | (2006.01) |
| *B60R 21/015* | (2006.01) |
| *B60R 21/214* | (2011.01) |
| *G05D 1/02* | (2020.01) |

(52) U.S. Cl.
CPC ........ *B60R 21/01* (2013.01); *B60R 21/01554* (2014.10); *B60R 21/203* (2013.01); *B60R 21/205* (2013.01); *B60R 21/207* (2013.01); *B60R 21/214* (2013.01); *B60R 21/233* (2013.01); *B62D 1/183* (2013.01); *B60R 2021/01034* (2013.01); *G05D 1/021* (2013.01); *G05D 2201/0213* (2013.01)

(58) Field of Classification Search
CPC .................................................... B60R 21/01
See application file for complete search history.

(56) References Cited

U.S. PATENT DOCUMENTS

| | | | |
|---|---|---|---|
| 9,022,417 B2 * | 5/2015 | Breed | B60R 21/213 280/728.3 |
| 9,802,568 B1 * | 10/2017 | Larner | B60R 21/0134 |
| 2003/0195685 A1 * | 10/2003 | Mori | B60R 21/203 701/45 |
| 2014/0054880 A1 * | 2/2014 | Feinstein | B60R 21/203 280/731 |
| 2015/0137492 A1 * | 5/2015 | Rao | B60R 21/233 280/729 |
| 2017/0096168 A1 * | 4/2017 | Yang | B62D 15/0285 |
| 2018/0148010 A1 * | 5/2018 | Foltin | B60R 21/01512 |

(Continued)

*Primary Examiner* — Alex C Dunn

(57) ABSTRACT

An occupant airbag system for use in a vehicle with a retractable steering wheel includes a first airbag assembly located in the retractable steering wheel. The first airbag assembly is configured to deploy a first airbag cushion between an occupant and a rigid structure of the vehicle. The occupant airbag system also includes a second airbag assembly configured to deploy a second airbag cushion between the occupant and the rigid structure of the vehicle. The occupant airbag system also includes an airbag control module configured to suppress deployment of the first airbag cushion and to enable deployment of the second airbag cushion when the retractable steering wheel is in a retracted position.

18 Claims, 11 Drawing Sheets

(56) References Cited

U.S. PATENT DOCUMENTS

| | | | |
|---|---|---|---|
| 2018/0162310 A1* | 6/2018 | Szawarski | B60R 21/231 |
| 2019/0031132 A1* | 1/2019 | Dry | B60R 21/207 |
| 2019/0106077 A1* | 4/2019 | Dry | B60R 21/215 |
| 2019/0135220 A1* | 5/2019 | Rupp | B60R 21/237 |
| 2019/0367072 A1* | 12/2019 | Hansen | B62D 1/183 |
| 2020/0001815 A1* | 1/2020 | Minakawa | B62D 1/04 |
| 2020/0017123 A1* | 1/2020 | Aizawa | B60W 50/12 |

* cited by examiner

OCCUPANT AIRBAG AND CONTROL SYSTEM FOR USE IN AUTONOMOUS VEHICLES WITH RETRACTABLE STEERING WHEELS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to occupant airbags and control systems for use in autonomous vehicles with retractable steering wheels.

Some autonomous vehicles are operable in both a driver mode and in an autonomous mode. In the driver mode, an occupant of the vehicle operates the controls of the vehicle when the vehicle is in motion. In the autonomous mode, one or more automated systems control the vehicle with little to no input from the occupant when the vehicle is in motion.

In some autonomous vehicles that are operable in both the driver mode and the autonomous mode, the steering wheel that is used steer the vehicle in the driver mode is retractable. When the autonomous vehicle is in the driver mode, the steering wheel is in an extended position for use by an occupant. When the autonomous vehicle is switched to the autonomous mode, the steering wheel moves from the extended position to a retracted position to provide increased space in the vehicle cabin.

SUMMARY

In one example in accordance with the present disclosure, an occupant airbag system for use in a vehicle with a retractable steering wheel includes a first airbag assembly located in the retractable steering wheel. The first airbag assembly is configured to deploy a first airbag cushion between an occupant and a rigid structure of the vehicle. The occupant airbag system also includes a second airbag assembly configured to deploy a second airbag cushion between the occupant and the rigid structure of the vehicle. The occupant airbag system also includes an airbag control module configured to suppress deployment of the first airbag cushion and to enable deployment of the second airbag cushion when the retractable steering wheel is in a retracted position.

In one aspect, the airbag control module is configured to suppress deployment of the second airbag cushion and to enable deployment of the first airbag cushion when the retractable steering wheel is in an extended position.

In one aspect, the second airbag assembly is not located in the retractable steering wheel.

In one aspect, the second airbag assembly is located in the rigid structure of the vehicle.

In one aspect, the rigid structure is an instrument panel.

In one aspect, the second airbag assembly is located in an instrument panel of the vehicle.

In one aspect, the second airbag assembly is located in a roof of the vehicle.

In one aspect, the second airbag assembly is located in a seat in the vehicle.

In one aspect, the occupant airbag system includes a position sensor configured to send a position signal indicative of a position of the retractable steering wheel to the airbag control module and the airbag control module is configured to determine if the retractable steering wheel is in the retracted position based on the position signal from the position sensor.

In one aspect, the occupant airbag system includes a position sensor configured to send a position signal indicative of a position of the retractable steering wheel to the airbag control module. The airbag control module is configured to suppress deployment of the first airbag cushion from the first airbag assembly and to enable deployment of the second airbag cushion from the second airbag assembly when the airbag control module determines that a retraction distance of the retractable steering wheel is greater than a first predetermined distance.

In one aspect, the occupant airbag system includes a seat position sensor configured to send a seat position signal indicative of a position of a seat in the vehicle to the airbag control module. The airbag control module is configured to suppress deployment of the first airbag cushion and to enable deployment of the second airbag cushion when the airbag control module determines that a separation distance between the retractable steering wheel and the seat is greater than a second predetermined distance.

In one aspect, the first predetermined distance is based on a position of the retractable steering wheel at which the second airbag cushion deploys without interference from the retractable steering wheel.

In one aspect, the second predetermined distance is based on a relative position between the retractable steering wheel and the seat at which the second airbag cushion can deploy without interference from the retractable steering wheel and the seat.

In one aspect, the rigid structure is an instrument panel in the vehicle and the second airbag assembly is positioned in the instrument panel and is configured to deploy the second airbag cushion from a top surface of the instrument panel above the retractable steering wheel.

In one aspect, the vehicle is an autonomous vehicle and the retractable steering wheel moves from an extended position to the retracted position when the autonomous vehicle is switched from a driver mode to an autonomous mode.

In one aspect, the retractable steering wheel moves away from the occupant to a position under the second airbag assembly when the retractable steering wheel moves from an extended position to the retracted position.

In another example in accordance with the present disclosure, an occupant airbag system for use in an autonomous vehicle includes an airbag control module with an airbag deployment module, a steering wheel position module and a seat position module. The occupant airbag system also includes a first airbag assembly positioned in a retractable steering wheel of the autonomous vehicle. The first airbag assembly is in communication with the airbag control module. The occupant airbag system also includes a second airbag assembly positioned in an instrument panel of the autonomous vehicle. The second airbag assembly is in communication with the airbag control module. The occupant airbag system also includes a steering wheel position sensor in communication with the airbag control module. The steering wheel position sensor is configured to send a first position signal to the airbag control module indicative of a position of the retractable steering wheel. The occupant airbag system also includes a seat position sensor in communication with the airbag control module. The seat position sensor is configured to send a second position signal to the airbag control module indicative of a position of a seat in the autonomous vehicle. The airbag deployment module is configured to enable deployment of an instrument panel airbag cushion from the second airbag assembly and to suppress deployment of a steering wheel airbag cushion from the first airbag assembly when the first position signal and the second position signal indicate that the position of the retractable steering wheel and the position of the seat will not interfere with deployment of the instrument panel airbag cushion.

In one aspect, the steering wheel position module is configured to determine a position of the retractable steering wheel relative to the instrument panel based on the first position signal.

In one aspect, the seat position module is configured to determine a position of the seat relative to the instrument panel based on the second position signal.

In one aspect, the airbag deployment module is further configured to enable deployment of the steering wheel airbag cushion from the first airbag assembly and to suppress deployment of the instrument panel airbag cushion from the second airbag assembly when the first position signal indicates that the position of the retractable steering wheel will interfere with deployment of the instrument panel airbag cushion.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The occupant airbag systems of the present disclosure control the deployment of multiple airbag assemblies in the vehicle cabin of a vehicle. In one example, the vehicle is an autonomous vehicle that is operated in a driver mode and in an autonomous mode. In the driver mode, the steering wheel assembly is in an extended position in which a steering wheel is positioned in front of an occupant that is seated in a seat of the vehicle. In the autonomous mode, the steering wheel moves from the extended position to a retracted position in an instrument panel of the vehicle.

The occupant airbag system, in this example, includes an airbag control module, a first airbag assembly that is mounted in the steering wheel of the vehicle and a second airbag assembly that is mounted in a position other than in the steering wheel of the vehicle (e.g., in the instrument panel, in the roof or in the seat). The airbag control module controls the operation of the first airbag assembly and the second airbag assembly based on the operating mode of the vehicle, the position of the steering wheel and/or the position of the seat.

When the vehicle is operated in the driver mode, the airbag control module enables deployment of an airbag cushion from the first airbag assembly located in the steering wheel and suppresses deployment of an airbag cushion from the second airbag assembly. Under this setting, the occupant airbag system deploys the airbag cushion from the steering wheel when a collision event occurs.

When the vehicle is switched to the autonomous mode of operation, the steering wheel moves away from the occupant in the vehicle and into the instrument panel. When the airbag control module determines that the steering wheel is fully retracted and/or that the airbag cushion from the second airbag assembly can be deployed without interference, the airbag control module suppresses deployment of the airbag cushion from the first airbag assembly and enables deployment of the airbag cushion from the second airbag assembly. Under this setting, the occupant airbag system deploys the airbag cushion from the alternate location (e.g., the instrument panel, the roof or the seat) when the steering wheel is in the retracted position.

Figure 1:
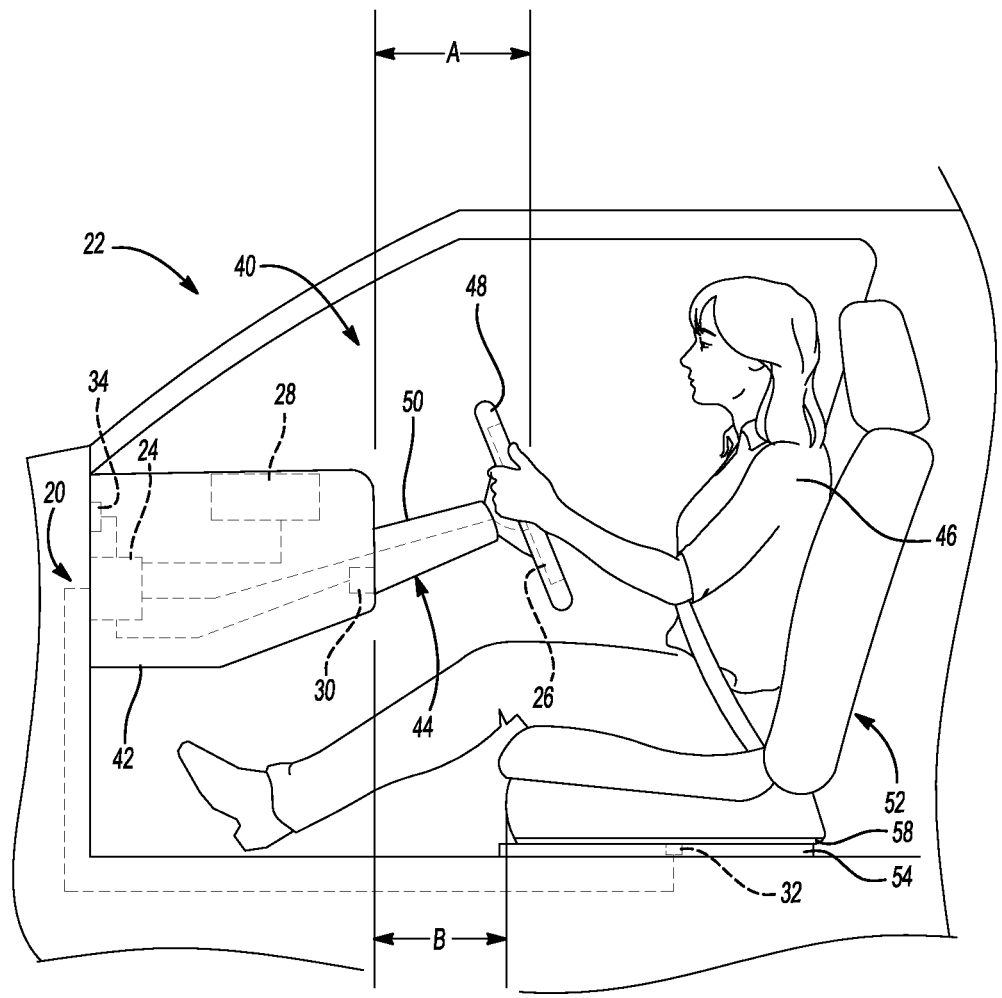
FIG. 1 is an illustration of a vehicle including one example occupant airbag system in accordance with the present disclosure.

Referring now to FIG. 1, an example occupant airbag system 20 is mounted in a vehicle 22. The occupant airbag system 20 includes an airbag control module 24, a steering wheel airbag assembly 26, an instrument panel airbag assembly 28, a steering wheel position sensor 30, a seat position sensor 32 and a collision sensor 34. As will be further explained below, the occupant airbag system 20 is operable to alternatively cause an airbag cushion in the steering wheel airbag assembly 26 or an airbag cushion in the instrument panel airbag assembly 28 to deploy in response to receiving an indication of a collision event from the collision sensor 34.

As shown, the occupant airbag system 20 is located inside a vehicle cabin 40 of the vehicle 22. In this example, the airbag control module 24, the collision sensor 34, the instrument panel airbag assembly 28 and the steering wheel position sensor 30 are located inside the instrument panel 42. A steering wheel assembly 44 is connected to the instrument panel 42 and projects outward from the instrument panel 42 toward an occupant 46. The steering wheel assembly 44 includes a steering wheel 48 and a steering column 50. The occupant 46 is seated in a seat 52 opposite to the instrument panel 42 and the steering wheel assembly 44. As can be appreciated, the occupant 46 grips the steering wheel 48 to control the direction of the vehicle 22 when the vehicle 22 is operated in the driver mode. The occupant 46, in the example shown, is seated in the driver's seat 52 of the vehicle 22. The terms occupant and passenger are used, however, to describe persons seated in any position inside the vehicle cabin 40.

The steering wheel position sensor 30 is mounted in the instrument panel 42. In other examples, the steering wheel position sensor 30 can be mounted in the steering column 50 or on the steering wheel 48. The steering wheel position sensor 30 is any suitable sensor (e.g., proximity sensor, hall sensor, or the like) that provides information regarding the position of the steering wheel 48 relative to the instrument panel 42 (i.e., distance A).

The collision sensor 34, in the example shown, is also mounted in the instrument panel 42. The collision sensor 34 is any suitable sensor (e.g., accelerometer, inertia sensor, pressure sensor, or the like) with the functionality to indicate that the vehicle 22 is involved in a collision event.

The seat position sensor 32 is coupled to the seat 52. In the example shown, the seat position sensor 32 is positioned on a floor-mounted support structure 54. The support structure 54 is mounted to a floor of the vehicle and supports the seat 52. A complimentary seat-mounted support structure 58 is mounted to the seat 52 and is moveably coupled to the support structure 54. The support structure 54 and the complimentary support structure 58 move relative to one another such that that the seat 52 moves inside the vehicle 22. The occupant 46 adjusts the seat 52, as desired, to move the seat 52 into a comfortable position relative to the steering wheel 48 and/or the instrument panel 42.

The seat position sensor 32 is any suitable sensor (e.g., proximity sensor, hall sensor or the like) that provides information to the airbag control module 24 regarding the position of the seat 52. In the example shown, the seat position sensor 32 provides information regarding the relative position of the support structure 54 relative to the complimentary support structure 58. This information, in turn, is used to determine a position of the seat 52 relative to the instrument panel 42 (i.e., distance B).

Figure 2:
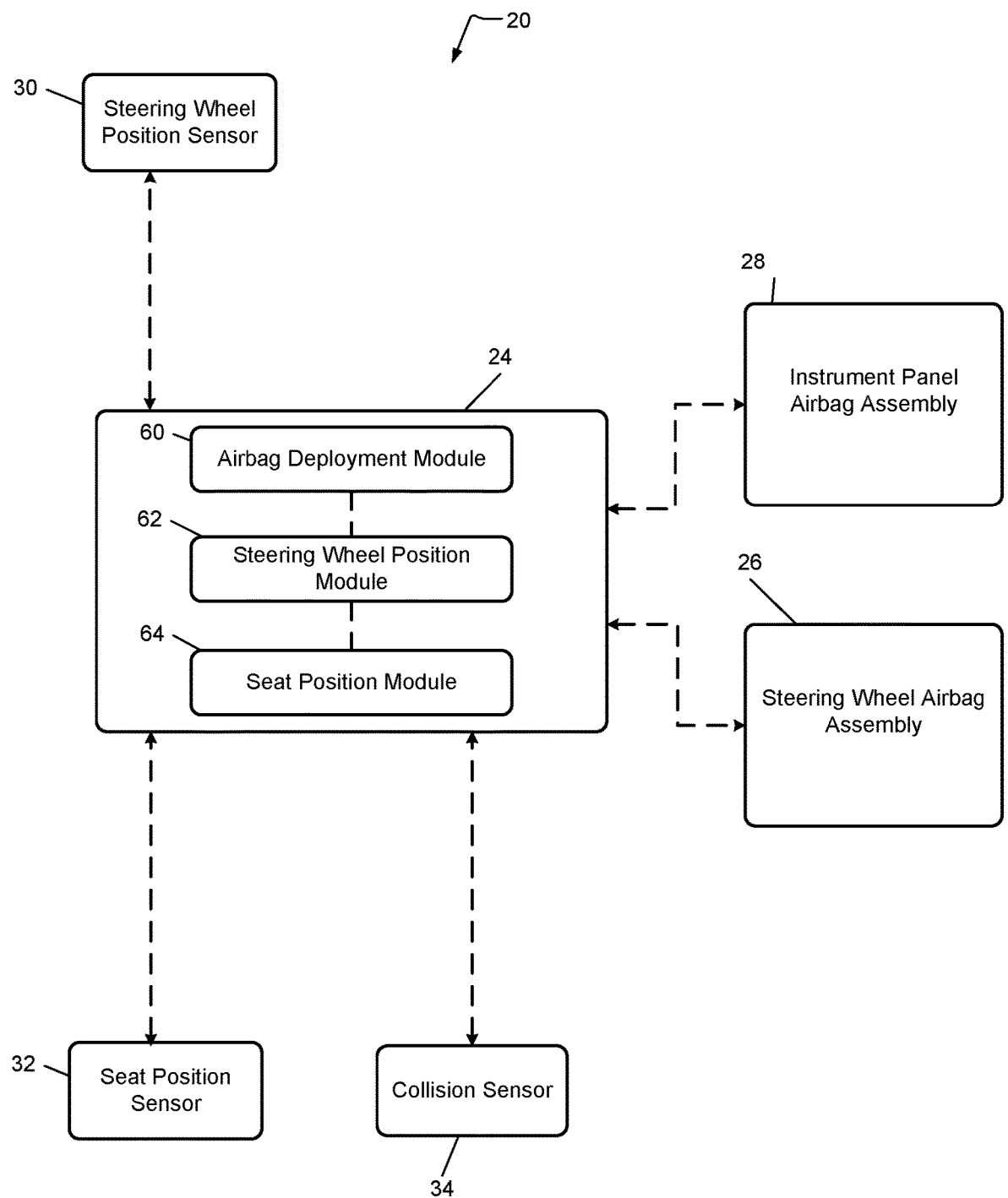
FIG. 2 is a block diagram illustrating the example occupant airbag system of FIG. 1.

Referring now to FIG. 2, an example airbag control module 24 is shown coupled to the steering wheel airbag assembly 26, the instrument panel airbag assembly 28, the steering wheel position sensor 30, the seat position sensor 32 and the collision sensor 34. The airbag control module 24 is in communication with these elements. The airbag control module 24 communicates with the steering wheel airbag assembly 26 and enables deployment of a steering wheel airbag cushion 70 (FIG. 8) or suppresses deployment of the steering wheel airbag cushion 70. The airbag control module 24 communicates with the instrument panel airbag assembly and enables deployment of an instrument panel airbag cushion 72 (FIG. 9) or suppresses deployment of the steering wheel airbag cushion 70.

The airbag control module 24 also communicates with the steering wheel position sensor 30. The airbag control module 24 receives a position signal from the steering wheel position sensor 30 that includes information regarding the position of the steering wheel 48 and/or of the steering column 50. The airbag control module 24 receives a position signal from the seat position sensor 32 that includes information regarding the position of the seat 52. The airbag control module 24 also receive a collision signal from the collision sensor 34 that includes information regarding whether the vehicle 22 has been involved in a collision event.

As further shown in FIG. 2, the airbag control module 24, in the example shown, includes an airbag deployment module 60, a steering wheel position module 62 and a seat position module 64. As will be further described, the airbag deployment module 60 is configured to receive the collision signal from the collision sensor 34 and send a signal to the steering wheel airbag assembly 26 and/or to the instrument panel airbag assembly 28. The airbag deployment module 60 alternatively enables deployment of the instrument panel airbag cushion 72 and/or the steering wheel airbag cushion 70 or suppresses deployment of the instrument panel airbag cushion 72 and/or the steering wheel airbag cushion 70 based on the position signals from the steering wheel position sensor 30 and/or the seat position sensor 32.

The steering wheel position module 62 is configured to receive the position signal from the steering wheel position sensor 30 and determine a position of the steering wheel 48 and/or compare the position of the steering wheel 48 to one or more predetermined positions. Referring back to FIG. 1, the steering wheel position module 62, in this example, determines the distance A that the steering wheel 48 projects outward from the instrument panel 42. In other examples, the steering wheel position module 62 can determine other distances or relative positions of the steering wheel 48. The seat position module 64 is configured to receive the position signal from the seat position sensor 32 and determine a position of the seat 52 and/or compare the position of the seat 52 to one or more predetermined positions. In this example, the seat position module 64 is configured to determine the distance B that corresponds to a distance between a forward edge of the seat 52 and the instrument panel 42. In other examples, the seat position module 64 can determine other distances or relative positions of the seat 52.

Figure 3:
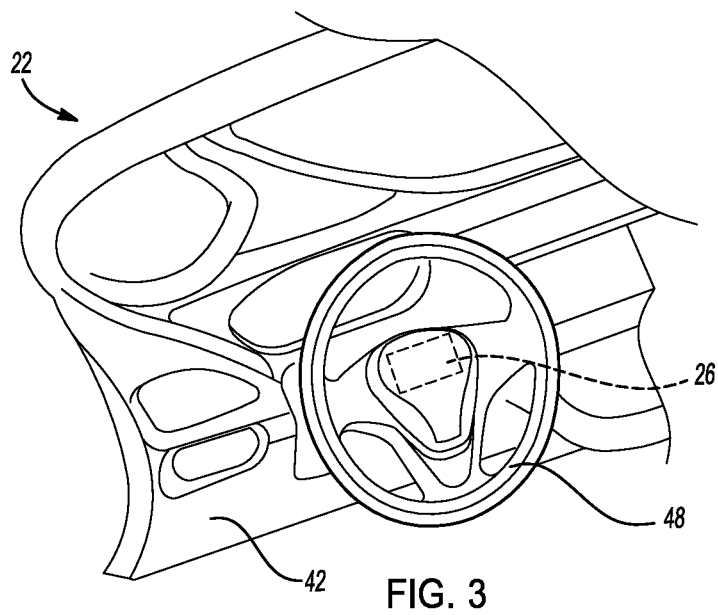
FIG. 3 is an illustration of an instrument panel of the vehicle of FIG. 1 showing the steering wheel in an extended position.
Figure 4:
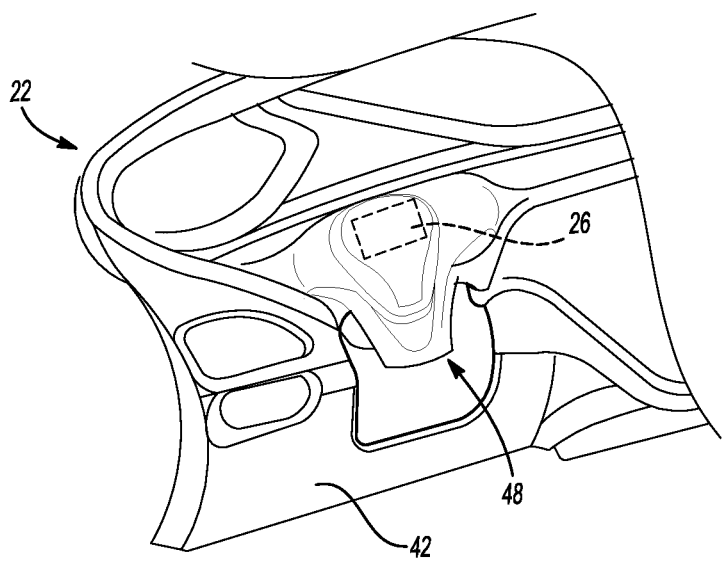
FIG. 4 is an illustration of the instrument panel of FIG. 2 showing the steering wheel in a retracted position.

As shown in FIGS. 3 and 4, the steering wheel 48 is retractable. The steering wheel 48 is in an extended position (FIG. 3) when the vehicle 22 is operated in the driver mode. In the driver mode, the occupant 46 controls the direction of the vehicle by gripping the steering wheel 48 in a conventional manner. The vehicle 22 is also operable in an autonomous mode. In the autonomous mode, the steering wheel 48 moves away from the occupant 46 and toward the instrument panel 42. In this example, the steering wheel 48 is positioned inside the instrument panel 42 after the steering wheel moves to the retracted position (FIG. 4). In other examples, the steering wheel 48 can retract different distances, can fold when it retracts, or move in different directions or orientations with respect to the instrument panel 42.

Figure 5:
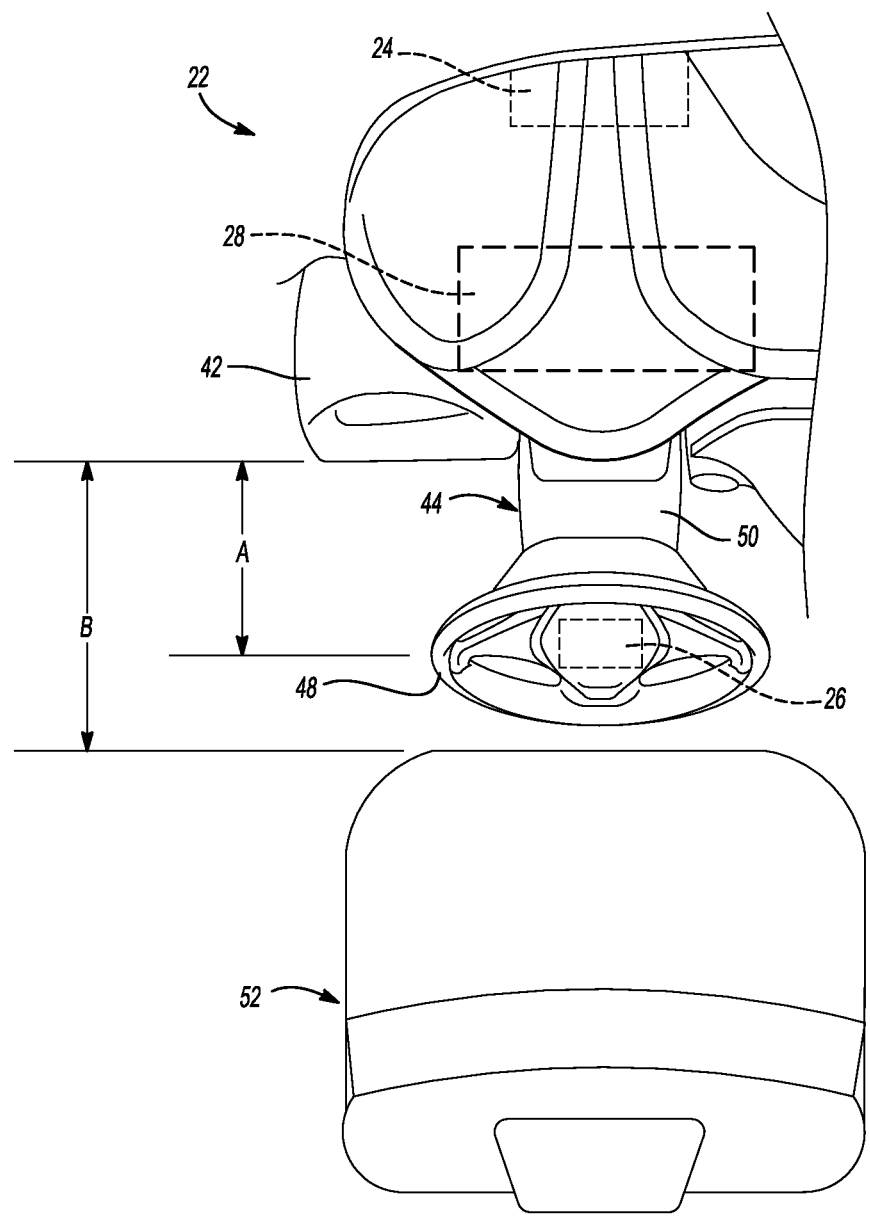
FIG. 5 is a top view of the vehicle of FIG. 1 showing the steering wheel in the extended position.
Figure 6:
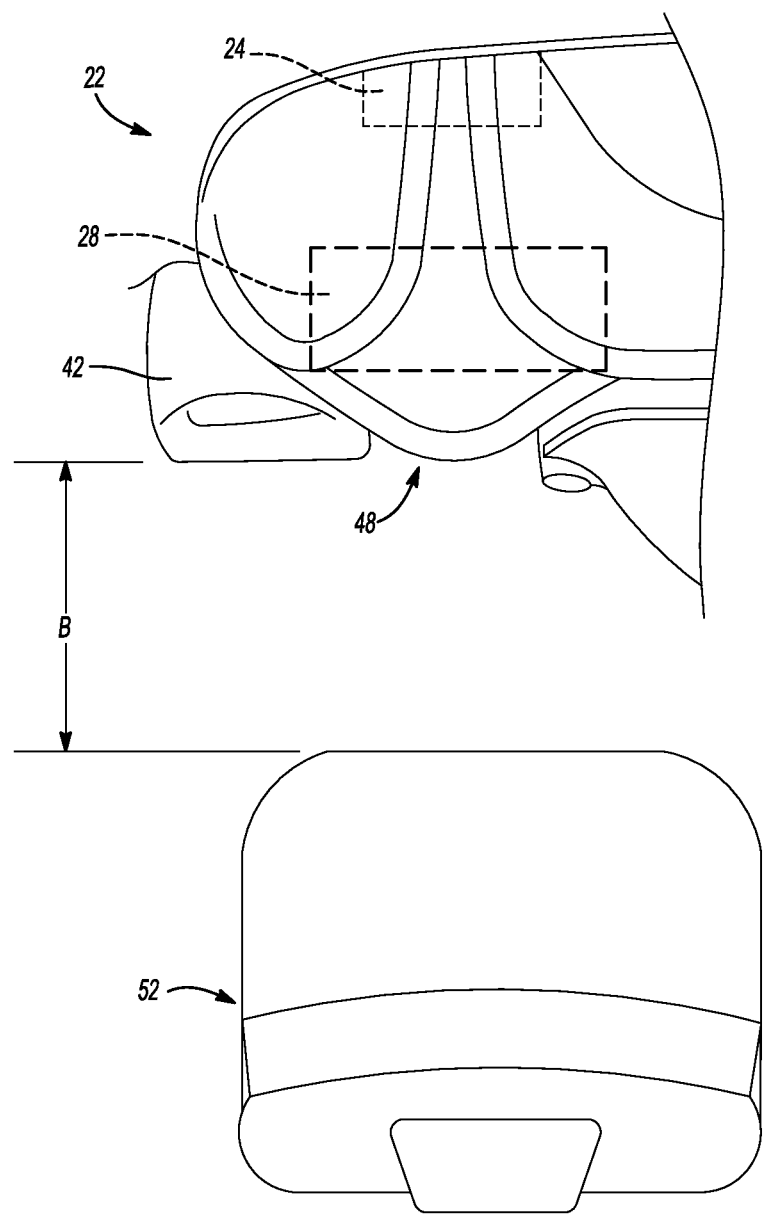
FIG. 6 is a top view of the vehicle of FIG. 1 showing the steering wheel in the retracted position.
Figure 7:
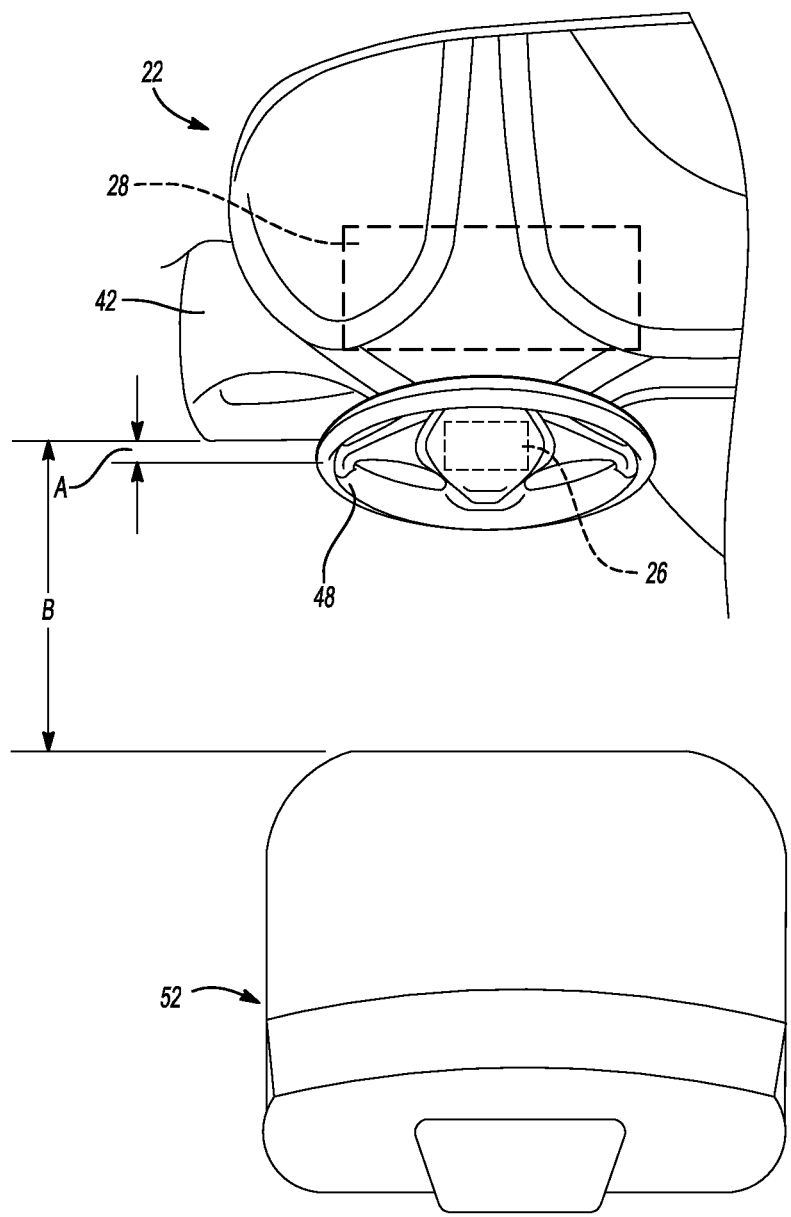
FIG. 7 is a top view of the vehicle of FIG. 1 showing the steering wheel in a partially retracted position.

Referring now to the FIGS. 5-7, the steering wheel 48 is shown in the extended position. In this position, the steering wheel 48 is positioned at a distance A from the instrument panel 42. The seat 52 is positioned at a distance B from the instrument panel 42. When the vehicle 22 is in the configuration as shown, the airbag control module 24 enables the deployment of the steering wheel airbag cushion 70 from the steering wheel airbag assembly 26 and suppresses deployment of the instrument panel airbag cushion 72 from the instrument panel airbag assembly 28.

Figure 8:
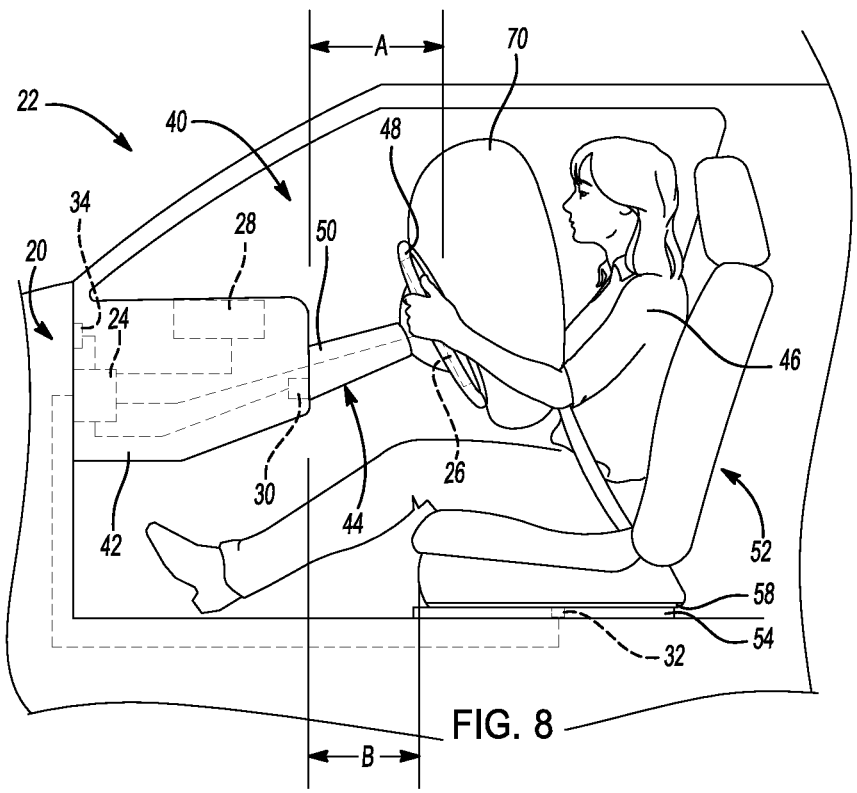
FIG. 8 is an illustration of the vehicle of FIG. 1 with the steering wheel in the extended position and a steering wheel airbag cushion deployed.
Figure 9:
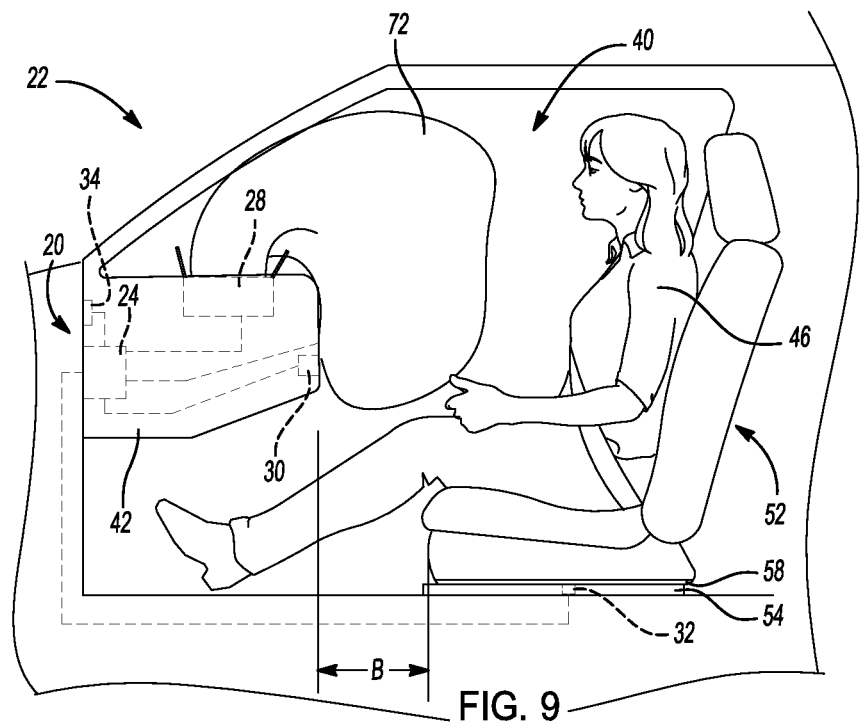
FIG. 9 is an illustration of the vehicle of FIG. 1 with the steering wheel in the retracted position and an instrument panel airbag cushion deployed.

In this configuration (and as shown in FIG. 8), the airbag control module 24 causes the steering wheel airbag cushion 70 to deploy from the steering wheel airbag assembly 26 after the airbag control module 24 receives information from the collision sensor 34 that the vehicle 22 is involved in a collision event. It is desirable that the airbag control module 24 suppresses the deployment of the instrument panel airbag cushion 72 because the instrument panel airbag cushion 72 would be unable to fully deploy since the steering wheel assembly 44 is positioned between the instrument panel 42 and the occupant 46.

In an alternate condition (shown in FIGS. 6 and 9), for example, the vehicle 22 is operating in the autonomous mode. In the autonomous mode, the steering wheel 48 is in the retracted position. In this condition, the airbag control module 24 enables deployment of the instrument panel airbag cushion 72 and suppresses deployment of the steering wheel airbag cushion 70. Since the steering wheel 48 is in the retracted position inside the instrument panel 42 (in this example), the steering wheel airbag cushion 70 is unable to deploy in a suitable manner and inflate to a position between the occupant 46 and the instrument panel 42. Instead, the airbag control module 24 causes the instrument panel airbag cushion 72 to deploy when the airbag control module 24 receives information from the collision sensor 34 that the vehicle 22 is involved in a collision event.

Figure 10:
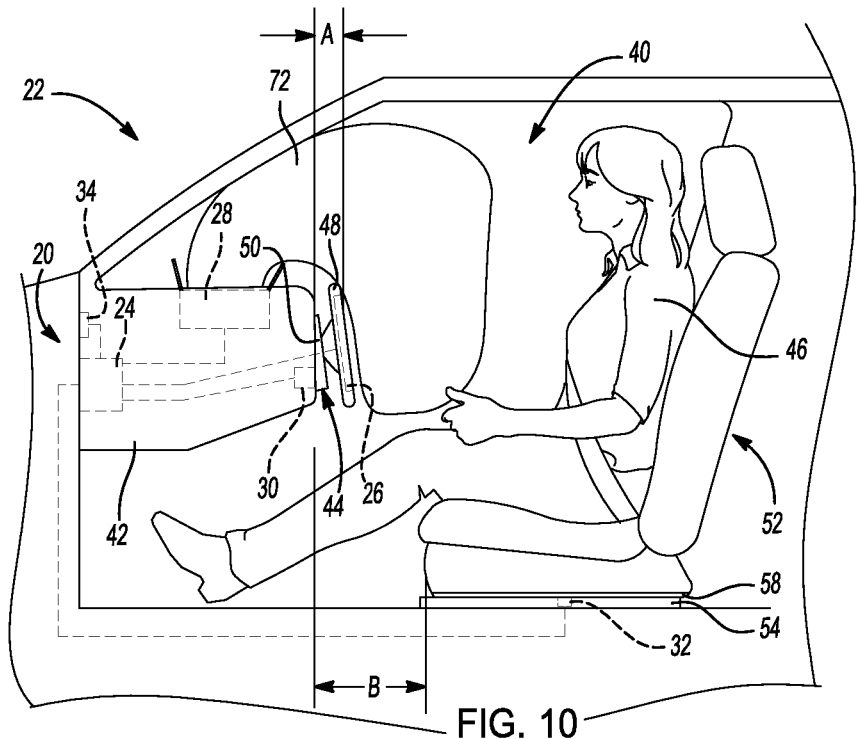
FIG. 10 is an illustration of the vehicle of FIG. 1 with the steering wheel in the partially retracted position and the instrument panel airbag cushion deployed.

As shown in FIGS. 7 and 10, the steering wheel 48 has moved from the extended position (FIGS. 5 and 8) toward the instrument panel 42. In this circumstance, the steering wheel 48 has not fully retracted to the retracted position (FIGS. 6 and 9) and is, instead, in a partially retracted position. In the example shown, the airbag control module 24 suppressed the deployment of the steering wheel airbag cushion 70 and enabled deployment of the instrument panel airbag cushion 72. As shown, the instrument panel airbag cushion 72 is fully inflated to a deployed position between the occupant 46 and the instrument panel 42.

The airbag control module 24 operates to alternatively deploy either the steering wheel airbag cushion 70 or the instrument panel airbag cushion 72. The airbag control module 24 determines whether the steering wheel airbag cushion 70 and/or the instrument panel airbag cushion 72 can fully inflate to a deployed position without interference from components inside the vehicle cabin 40. After such a determination, the appropriate airbag cushion is enabled and the other is suppressed.

For example, the steering wheel 48 may not fully retract and is positioned such that it or the steering column 50 interferes with the full inflation of the instrument panel airbag cushion 72. In such a circumstance, the steering wheel airbag cushion 70 is enabled and the instrument panel airbag cushion 72 is suppressed. In another example circumstance, the steering wheel 48 may be in a retracted position but the seat 52 is positioned in proximity to the steering wheel 48 such that the spacing of the steering wheel 48 and the occupant 46 and/or the seat 52 prevents full inflation of the instrument panel airbag cushion 72. In such a circumstance, the steering wheel airbag cushion 70 is enabled and the instrument panel airbag cushion is suppressed. In still other circumstances, the steering wheel 48 and/or the seat 52 are positioned in other relative positions to interfere with the full inflation of the steering wheel airbag cushion 70 and/or the instrument panel airbag cushion 72.

Figure 13:
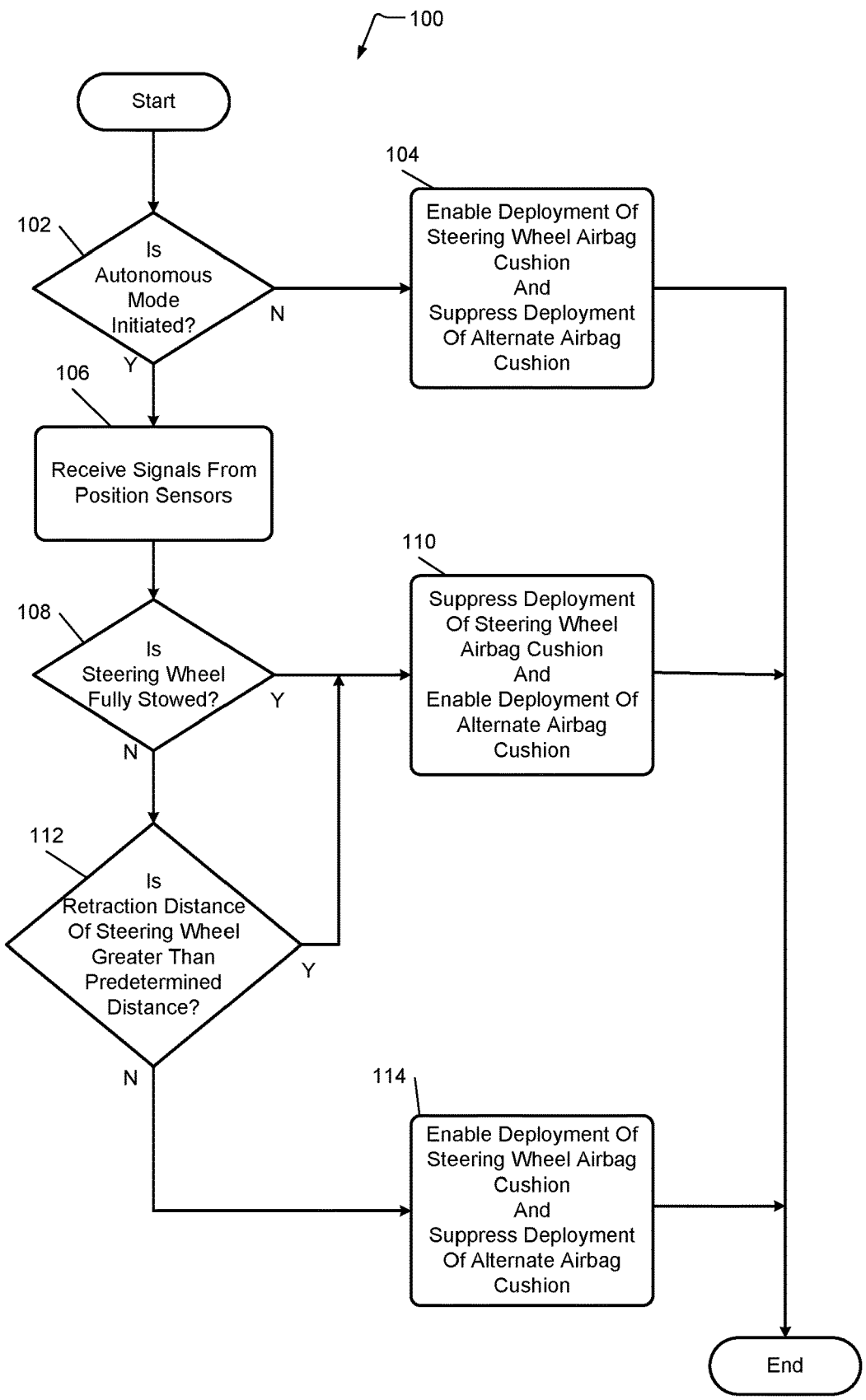
FIG. 13 is a flow chart illustrating one example method of controlling the occupant airbag system in accordance with the present disclosure.
Figure 14:
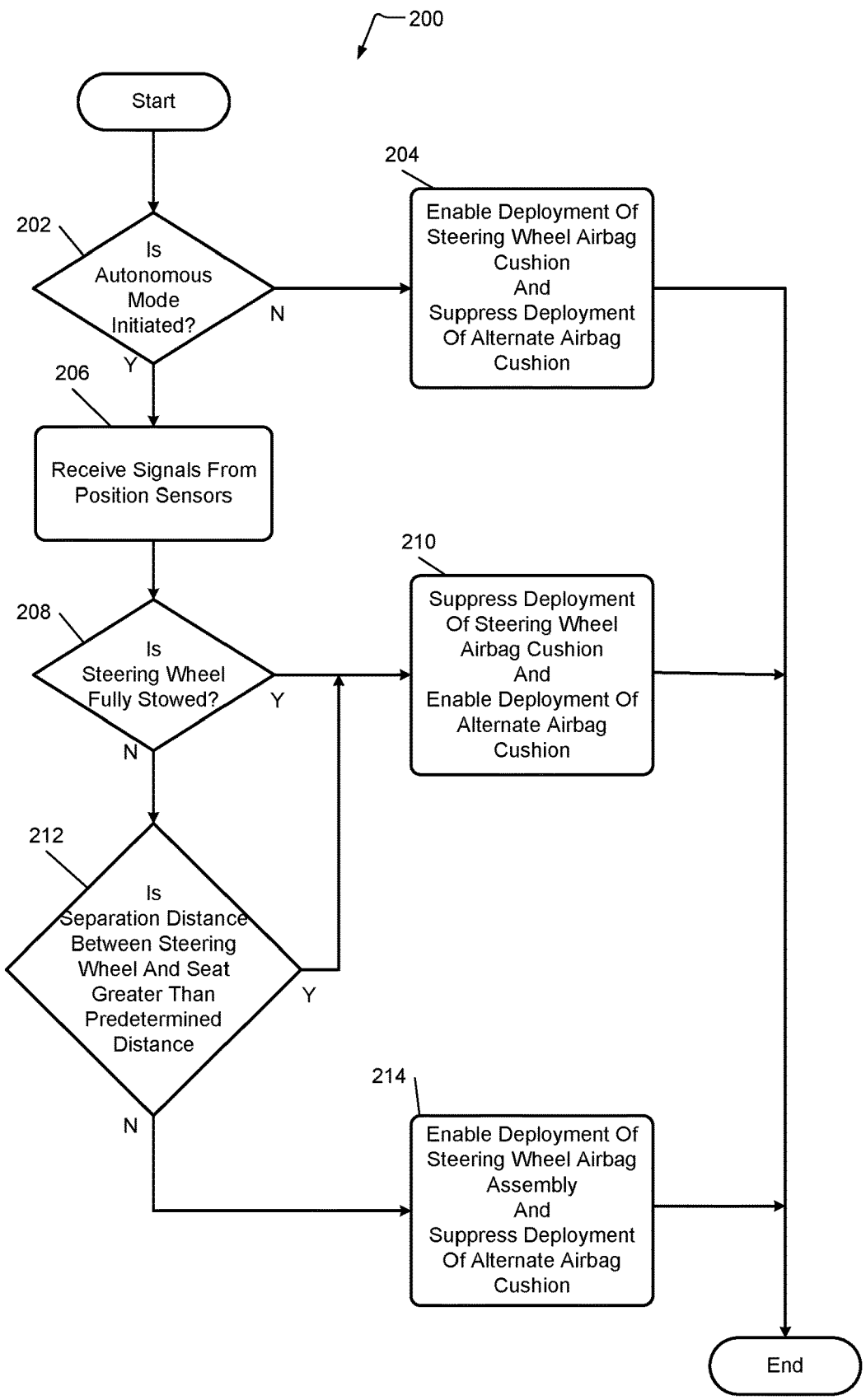
FIG. 14 is a flow chart illustration another example method of controlling the occupant airbag system in accordance with the present disclosure.

In the example shown, the airbag control module 24 determines which airbag cushion to enable and which airbag cushion to suppress based on information received from the steering wheel position sensor 30 and/or the seat position sensor 32. In a first example method of operation (shown in FIG. 13 and described further below), the airbag control module 24 determines whether the instrument panel airbag cushion 72 can fully deploy based on a retraction distance of the steering wheel 48. In such an example, the airbag control module 24 compares the distance A to a predetermined distance. If the steering wheel 48 has retracted a sufficient distance (i.e., distance A is greater than the predetermined distance) to enable full deployment of the instrument panel airbag cushion 72, the airbag control module 24 enables deployment of the instrument panel airbag cushion 72 and suppresses deployment of the steering wheel airbag cushion 70.

Alternatively, if the airbag control module 24 determines that the steering wheel 48 has not retracted a sufficient distance to permit full deployment of the instrument panel airbag cushion 72 (i.e., distance A is less than or equal to the predetermined distance), the airbag control module 24 suppresses deployment of the instrument panel airbag cushion 72 and enable deployment of the steering wheel airbag cushion 70.

Figure 11:
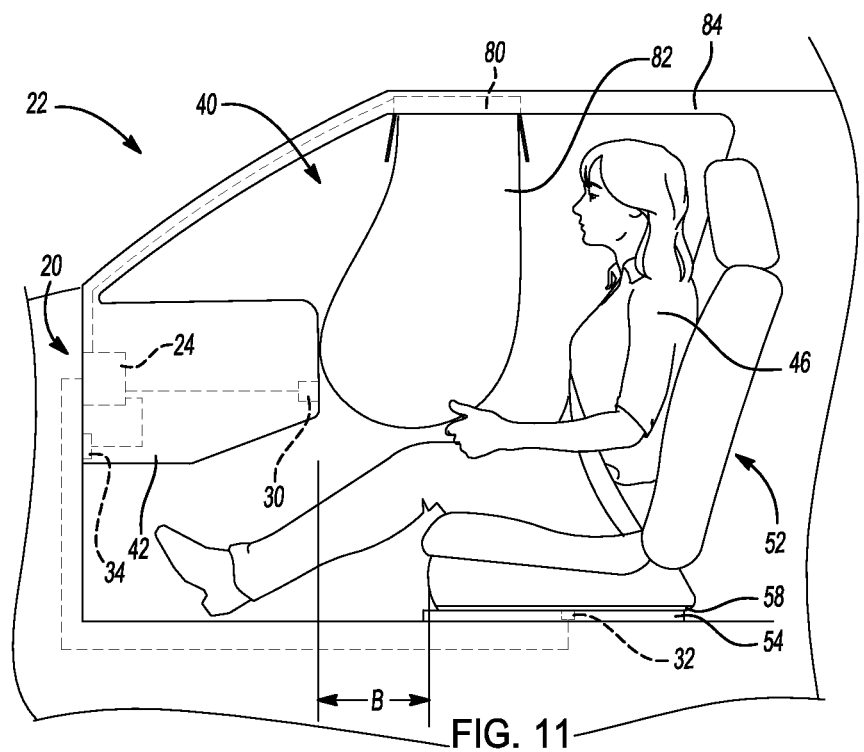
FIG. 11 is an illustration of the vehicle of FIG. 1 with the steering wheel in the retracted position and a roof airbag cushion deployed.

The vehicle 22, in other examples, includes other alternate airbag assemblies other than the instrument panel airbag assembly 28 previously described. In FIG. 11, for example, the vehicle 22 includes a roof airbag assembly 80. The roof airbag assembly 80 is mounted in the roof 84 of the vehicle 22. The roof airbag assembly 80 is positioned between the occupant 46 and the instrument panel 42. In this position, a roof airbag cushion 82 can deploy from the roof airbag assembly 80 at a position between the occupant 46 and the instrument panel 42.

As shown, the roof airbag assembly 80 is in communication with the airbag control module 24. The airbag control module 24 alternatively enables or suppresses the deployment of the roof airbag cushion 82 in a manner similar to that previously described with respect to the instrument panel airbag cushion 72. As such, the roof airbag cushion 82 is an alternate airbag cushion to the steering wheel airbag cushion 70.

Figure 12:
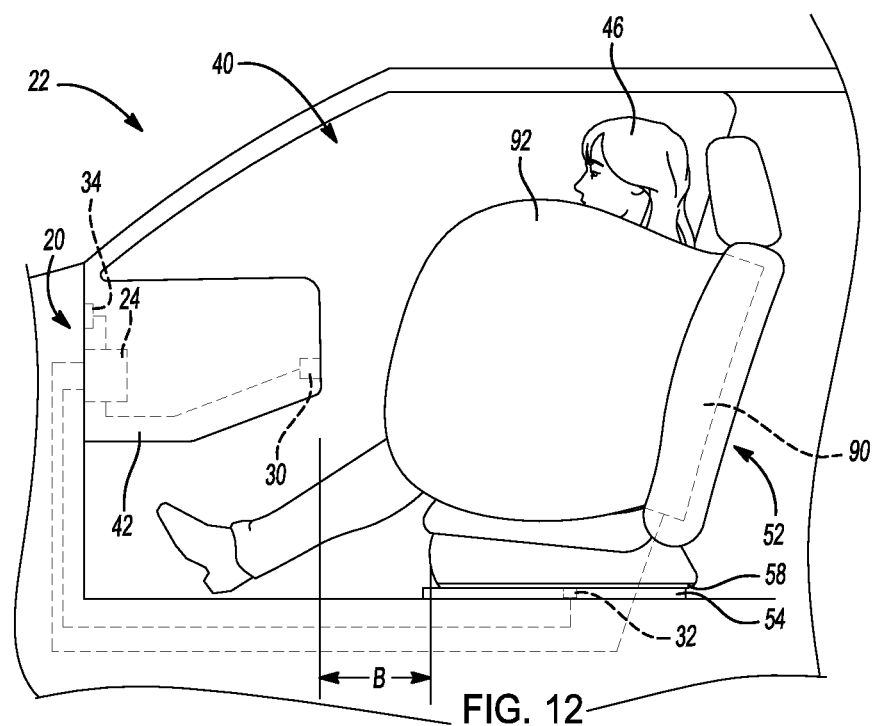
FIG. 12 is an illustration of the vehicle of FIG. 1 with the steering wheel in the retracted position and a seat airbag cushion deployed.

In FIG. 12, the vehicle 22 includes a seat airbag assembly 90. The seat airbag assembly 90 is mounted in or on the seat 52. The seat airbag assembly 90 is mounted in a suitable position such that a seat airbag cushion 92 deploys from the seat airbag assembly 90 and is positioned between the instrument panel 42 and the occupant 46 when in the deployed position.

As shown, the seat airbag assembly 90 is in communication with the airbag control module 24. The airbag control module 24 alternatively enables or suppresses the deployment of the seat airbag cushion 92 in a manner similar to that previously described with respect to the instrument panel airbag cushion 72. The seat airbag cushion is another alternate airbag cushion to the steering wheel airbag cushion 70.

In one example method of controlling the occupant airbag system 20, the method 100 (FIG. 13) begins at 102. At 102, the airbag control module 24 detects whether the vehicle 22 is switched from the driver mode to the autonomous mode. The airbag control module 24 detects whether this has occurred, for example, by receiving a signal from a user input device such as a switch, user-input screen, push button, or other input device. If the airbag control module 24 detects that the autonomous mode is initiated, the method continues to 106 otherwise the method moves to 104.

At 104, the airbag control module 24 enables deployment of the steering wheel airbag cushion 70 and suppresses deployment of the alternate airbag cushion (e.g., the instrument panel airbag cushion 72, the roof airbag cushion 82 or the seat airbag cushion 92). Since the vehicle 22 is operating in the driver mode and has not been switched to the autonomous mode, the steering wheel 48 is in the extended position. In such a circumstance, the airbag control module 24 maintains a condition in which the steering wheel airbag cushion 70 is deployed when the vehicle 22 is involved in a collision event.

At 106, the airbag control module 24 receives signals from the various position sensors. The airbag control module 24 receives position signals from, for example, the steering wheel position sensor 30 and/or the seat position sensor 32. After receiving the signals from the position sensors, the method continues to 108.

At 108, the airbag control module 24 determines if the steering wheel 48 is fully stowed. The airbag control module 24 determines, in one example, whether the steering wheel 48 is fully stowed by comparing the position signal received from the steering wheel position sensor 30 to a stowed distance. In other examples, the occupant airbag system 20 includes a proximity sensor (not shown) or other sensor that can send a signal to the airbag control module 24 indicating that the steering wheel 48 retracted into the instrument panel 42 to the fully stowed (or retracted) position. If the airbag control module 24 determines that the steering wheel is fully stowed, the method continues to 110. Otherwise, the method moves to 112.

At 110, the airbag control module 24 suppresses deployment of the steering wheel airbag cushion 70 and enables deployment of the alternate airbag cushion (e.g., the instrument panel airbag cushion 72, the roof airbag cushion 82 or the seat airbag cushion 92). The airbag control module 24 enables deployment of the alternate airbag cushion at 110 because the steering wheel 48 is in the retracted position. As such, the alternate airbag cushion can fully deploy into a position between the occupant 46 and the instrument panel 42.

At 112, the airbag control module 24 determines if the retraction distance of the steering wheel 48 is greater than a predetermined distance. At 112, the airbag control module 24 has previously determined that the steering wheel 48 is not fully stowed. The steering wheel 48, therefore, may be in a position to interfere with the full deployment of the alternate airbag cushion. The airbag control module 24 compares the position of the steering wheel 48 (i.e., distance A) to the predetermined distance. The predetermined distance is a distance at which the steering wheel 48 does not interfere with the full deployment of the alternate airbag cushion. The predetermined distance is based on the geometry of the vehicle 22, the geometry of the vehicle cabin 40, the size and shape of the instrument panel 42, the size and shape of the steering wheel assembly 44, the size and shape of the seat 52 and/or the size and weight of the occupant 46.

In one example, the predetermined distance is a percentage of the fully stowed distance of the steering wheel 48. In such an example, the predetermined distance is 90% of the fully stowed distance. In another example, the predetermined distance is between 90% and 70% of the fully stowed distance. In other examples, the predetermined distance can be determined via testing and/or simulations.

If the airbag control module 24 determines that the retraction distance of the steering wheel 48 is greater than the predetermined distance, the method moves to 110. If the airbag control module 24 determines that the retraction distance of the steering wheel 48 is not greater than the predetermined distance, the method moves to 114. As previously described above, at 110, the airbag control module 24 suppresses deployment of the steering wheel airbag cushion 70 and enables deployment of the alternate airbag cushion (e.g., the instrument panel airbag cushion 72, the roof airbag cushion 82 or the seat airbag cushion 92). The airbag control module 24 enables deployment of the alternate airbag cushion at 110 because the alternate airbag cushion can fully deploy into a position between the occupant 46 and the instrument panel 42.

At 114, the airbag control module 24 enables deployment of the steering wheel airbag cushion 70 and suppresses deployment of the alternate airbag cushion (e.g., the instrument panel airbag cushion 72, the roof airbag cushion 82 or the seat airbag cushion 92). The airbag control module 24 suppresses the alternate airbag cushion because the steering wheel 48 is positioned such that the alternate airbag cushion will not fully deploy because of interference from the steering wheel 48.

After 104, 110 and 114, the method 100 ends. While the method 100 is described and illustrated as ending, the method 100 may be repeated as a control loop whereby the airbag control module 24 repeats itself as the steering wheel 48 is in the process of moving from the extended position to the retracted position. Alternatively, the method 100 may be repeated as the airbag control module 24 monitors for a condition in which the vehicle 22 is switched from the driver mode to the autonomous mode.

In another example, the method 200 is similar to the method 100 previously described. As can be seen, at 202 to 208, the method 200 performs similarly to the steps 102 to 108 previously described. At step 212, however, the airbag control module 24 determines whether a separation distance between the steering wheel 48 and the seat 52 is greater than a predetermined separation distance.

At 212, the airbag control module 24 has the position information from the signals received from the steering wheel position sensor 30 and from the seat position sensor 32. From the signals, the airbag control module 24 determines the distance A and the distance B. The airbag control module 24 determines a separation distance (the difference between distance B and the distance A). The airbag control module 24 compares the separation distance to the predetermined separation distance. If the separation distance is greater than the predetermined separation distance, the method 100 continues to 210. If the separation distance is not greater than the predetermined separation distance, the method moves to 214.

The predetermined separation distance corresponds to a distance at which the steering wheel 48, the steering column 50, the occupant 46, the seat 52 or other components in the vehicle cabin 40 do not interfere with the deployment of the alternate airbag cushion. The predetermined separation distance is based on the geometry of the vehicle 22, the geometry of the vehicle cabin 40, the size and shape of the instrument panel 42, the size and shape of the steering wheel assembly 44, the size and shape of the seat 52 and/or the size and weight of the occupant 46. In other examples, the predetermined separation distance is determined based on testing or simulation.

At 210, the airbag control module 24 suppresses deployment of the steering wheel airbag cushion 70 and enables deployment of the alternate airbag cushion (e.g., the instrument panel airbag cushion 72, the roof airbag cushion 82 or the seat airbag cushion 92). The airbag control module 24 enables deployment of the alternate airbag cushion at 210 because the alternate airbag cushion can fully deploy into a position between the occupant 46 and the instrument panel 42.

At 214, the airbag control module 24 enables deployment of the steering wheel airbag cushion 70 and suppresses deployment of the alternate airbag cushion (e.g., the instrument panel airbag cushion 72, the roof airbag cushion 82 or the seat airbag cushion 92). The airbag control module 24 suppresses the alternate airbag cushion because the steering wheel 48 and/or the seat 52 is positioned such that the alternate airbag cushion will not fully deploy because of interference.

After 204, 210 and 214, the method 200 ends. While the method 200 is described and illustrated as ending, the method may be repeated as a control loop whereby the airbag control module 24 repeats itself as the steering wheel 48 is in the process of moving from the extended position to the retracted position. Alternatively, the method 200 may be repeated as the airbag control module 24 monitors for a condition in which the vehicle 22 is switched from the driver mode to the autonomous mode.

The previously described examples describe a vehicle 22 that includes the retracting steering wheel 48. The foregoing methods and examples can also be used in other transportation vehicles or other environments that include occupant airbag systems such as trains, boats, aircraft and the like. In addition, the methods and examples can be applied to other moving structures that may be provided in autonomous vehicles or other modes of transportation. Such other moving structures can include, for example, stowable tables, entertainment systems, storage compartments and the like.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An occupant airbag system for use in a vehicle with a retractable steering wheel, the occupant airbag system comprising:
   a first airbag assembly located in the retractable steering wheel, the first airbag assembly configured to deploy a first airbag cushion between an occupant and a rigid structure of the vehicle;
   a second airbag assembly configured to deploy a second airbag cushion between the occupant and the rigid structure of the vehicle;
   an airbag control module configured to suppress deployment of the first airbag cushion and to enable deployment of the second airbag cushion when the retractable steering wheel is in a retracted position;
   and a position sensor configured to send a position signal indicative of a position of the retractable steering wheel to the airbag control module,
   wherein the airbag control module is configured to suppress deployment of the first airbag cushion from the first airbag assembly and to enable deployment of the second airbag cushion from the second airbag assembly when the airbag control module determines that a retraction distance of the retractable steering wheel is greater than a first predetermined distance.

2. The occupant airbag system of claim 1, wherein the airbag control module is configured to suppress deployment of the second airbag cushion and to enable deployment of the first airbag cushion when the retractable steering wheel is in an extended position.

3. The occupant airbag system of claim 1, wherein the second airbag assembly is not located in the retractable steering wheel.

4. The occupant airbag system of claim 1, wherein the second airbag assembly is located in the rigid structure of the vehicle.

5. The occupant airbag system of claim 4, wherein the rigid structure is an instrument panel.

6. The occupant airbag system of claim 1, wherein the second airbag assembly is located in an instrument panel of the vehicle.

7. The occupant airbag system of claim 1, wherein the second airbag assembly is located in a roof of the vehicle.

8. The occupant airbag system of claim 1, wherein the second airbag assembly is located in a seat in the vehicle.

9. The occupant airbag system of claim 1, further comprising:
   a position sensor configured to send a position signal indicative of a position of the retractable steering wheel to the airbag control module, wherein the airbag control module is configured to determine if the retractable steering wheel is in the retracted position based on the position signal from the position sensor.

10. The occupant airbag system of claim 1, further comprising:
    a seat position sensor configured to send a seat position signal indicative of a position of a seat in the vehicle to the airbag control module, wherein the airbag control module is configured to suppress deployment of the first airbag cushion and to enable deployment of the second airbag cushion when the airbag control module determines that a separation distance between the retractable steering wheel and the seat is greater than a second predetermined distance.

11. The occupant airbag system of claim 1, wherein the first predetermined distance is based on a position of the retractable steering wheel at which the second airbag cushion deploys without interference from the retractable steering wheel.

12. The occupant airbag system of claim 10, wherein the second predetermined distance is based on a relative position between the retractable steering wheel and the seat at which the second airbag cushion can deploy without interference from the retractable steering wheel and the seat.

13. The occupant airbag system of claim 1, wherein:
    the rigid structure is an instrument panel in the vehicle; and the second airbag assembly is positioned in the instrument panel and is configured to deploy the second airbag cushion from a top surface of the instrument panel above the retractable steering wheel.

14. The occupant airbag system of claim 1, wherein the vehicle is an autonomous vehicle and the retractable steering wheel moves from an extended position to the retracted position when the autonomous vehicle is switched from a driver mode to an autonomous mode.

15. An occupant airbag system for use in an autonomous vehicle, the occupant airbag system comprising:
    an airbag control module including an airbag deployment module, a steering wheel position module and a seat position module;
    a first airbag assembly positioned in a retractable steering wheel of the autonomous vehicle, the first airbag assembly in communication with the airbag control module;
    a second airbag assembly positioned in an instrument panel of the autonomous vehicle, the second airbag assembly in communication with the airbag control module;
    a steering wheel position sensor in communication with the airbag control module, the steering wheel position sensor configured to send a first position signal to the airbag control module indicative of a position of the retractable steering wheel; and a seat position sensor in communication with the airbag control module, the seat position sensor configured to send a second position signal to the airbag control module indicative of the a position of a seat in the autonomous vehicle, wherein the airbag deployment module is configured to enable deployment of an instrument panel airbag cushion from the second airbag assembly and to suppress deployment of a steering wheel airbag cushion from the first airbag assembly when the first position signal and the second position signal indicate that the position of the retractable steering wheel and the position of the seat will not interfere with deployment of the instrument panel airbag cushion.

16. The occupant airbag system of claim 15 wherein the steering wheel position module is configured to determine a position of the retractable steering wheel relative to the instrument panel based on the first position signal.

17. The occupant airbag system of claim 15 wherein the seat position module is configured to determine a position of the seat relative to the instrument panel based on the second position signal.

18. The occupant airbag system of claim 15 wherein the airbag deployment module is further configured to enable deployment of the steering wheel airbag cushion from the first airbag assembly and to suppress deployment of the instrument panel airbag cushion from the second airbag assembly when the first position signal indicates that the position of the retractable steering wheel will interfere with deployment of the instrument panel airbag cushion.

\* \* \* \* \*